Nov. 21, 1950     F. E. O. ÖSTMAR     2,530,477
MEANS FOR BALANCING THE AXIAL THRUST OF ELASTIC FLUID
COMPRESSORS AND TURBINES OF THE AXIAL FLOW TYPE
Filed July 13, 1949     2 Sheets-Sheet 1
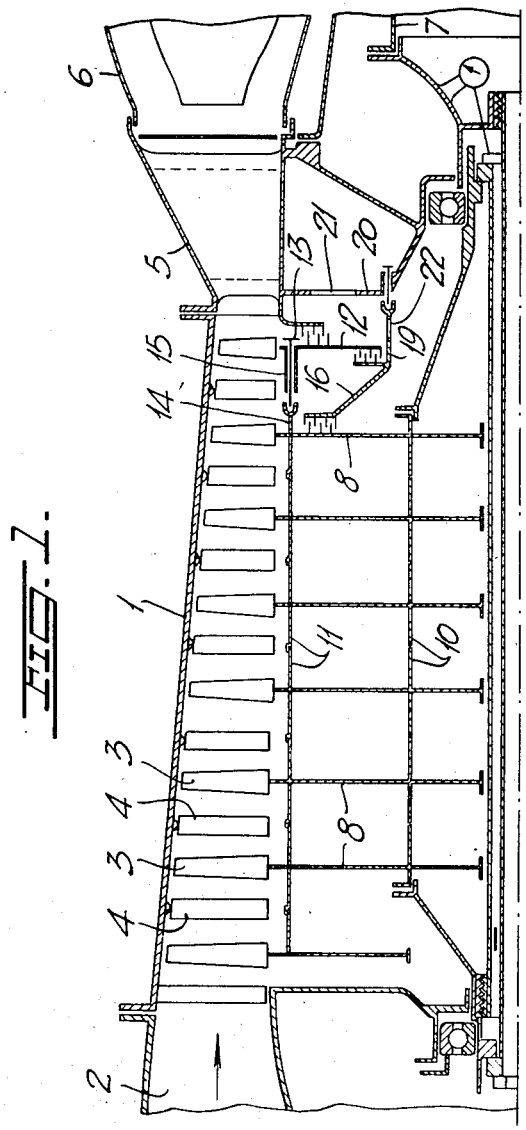
Inventor
Frans Eric Ossian Ostmar
by Sommers & Young
Attorneys

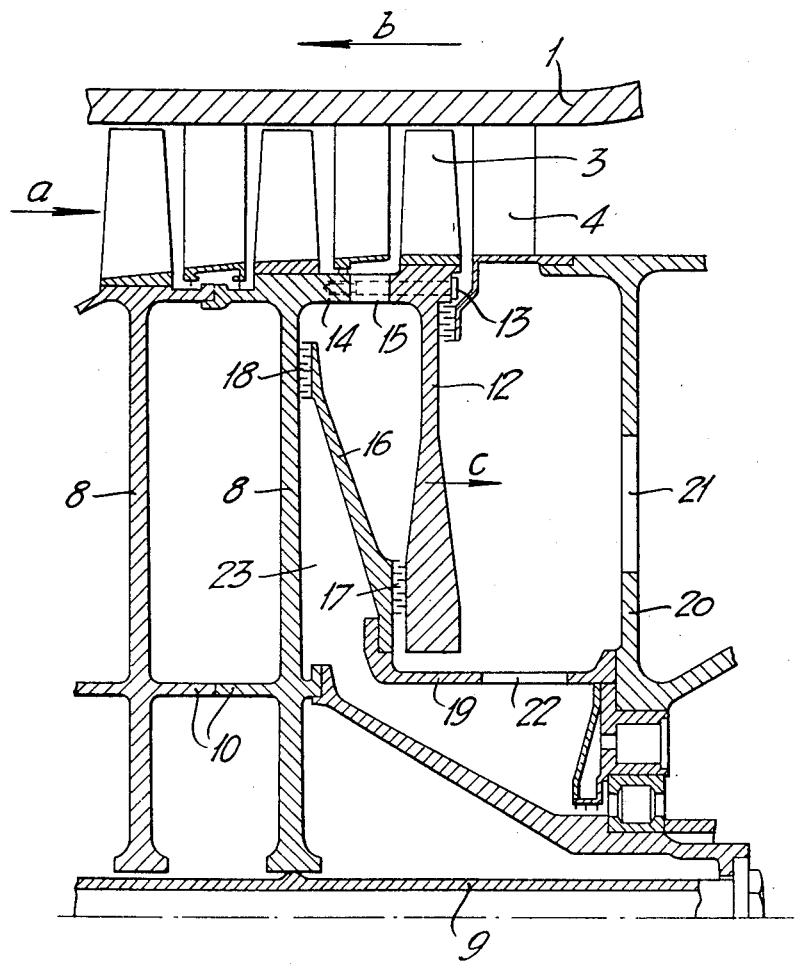

Patented Nov. 21, 1950

2,530,477

UNITED STATES PATENT OFFICE 2,530,477

MEANS FOR BALANCING THE AXIAL THRUST OF ELASTIC FLUID COMPRESSORS AND TURBINES OF THE AXIAL FLOW TYPE

Frans Eric Ossian Östmar, Finspong, Sweden

Application July 13, 1949, Serial No. 104,562
In Sweden September 22, 1948

8 Claims. (Cl. 230—122)

The present invention relates to axial flow elastic fluid machines, such as compressors and turbines, and more particularly to jet propulsion units including such machines.

The object of the invention is to provide improved means for balancing the axial thrust on the rotary elements of such machines.

It is already known in connection with axial flow elastic fluid compressors to balance the resulting axial thrust by withdrawing pressure fluid from the compressor and allowing it to act on a thrust disc in such a way as to subject said disc to a balancing axial thrust.

The invention relates more specifically to the provision of an improved thrust balancing device including such a thrust disc with a view to obtaining an effective balancing device with a minimum increase of the total weight of the rotary system.

According to the invention the thrust disc, which is in the shape of a ring, is removably connected at its outer periphery as by means of bolts to the outgoing end of the rotor of the machine adjacent the blading thereof, from where it extends inwardly in a freehung relation to the rotor, the space on one side of said thrust disc being in communication with the atmospheric pressure or another comparatively low pressure, whereas the space on the other side of the thrust disc is shielded off from said atmospheric or other low pressure by means of an annular balancing disc rigidly connected to the frame of the machine at its inner periphery, which bridges the space between the thrust disc and an adjacent end wall or partition of the rotor, said balancing disc being in a sealed engagement with the thrust disc at its inner periphery and with said rotor wall at its outer periphery so as to form between itself and the thrust disc a space closed against the atmospheric pressure or said other low pressure which is in communication with an inner pressure point of the blading of the machine, so that the surface of the thrust disc exposed to said space will be subjected to the pressure prevailing in the machine at said point while the space between the balancing disc and the rotor wall communicates with the atmospheric pressure or said other low pressure in order that the pressure on the thrust disc derived from the blading may not be balanced by a corresponding pressure on said rotor wall.

According to another feature of the invention the thrust disc supports an annular set of blades, preferably the last set of the blading of the machine.

Still another feature of the invention resides in the provision of the thrust disc at the outgoing end of a multiple section rotor of an axial flow compressor, which may be coupled, if desired, to a turbine for driving the compressor, the balancing disc being connected to and supported by a drum-like member axially projecting from the rigid outlet device of the compressor.

In the accompanying drawing a preferred embodiment of the invention is illustrated. Fig. 1 is a longitudinal section of one half-part of an axial flow compressor to which the present invention has been applied. Fig. 2 is a similar section on a larger scale of the balancing device.

With reference to Fig. 1, the numeral 1 indicates the casing of the compressor, 2 indicates the air intake thereof, 3 indicates the moving blades of the compressor, and 4 indicates guide blades secured to the casing. The numeral 5 designates a member forming a transmission passage leading to combustion chambers and a turbine of which, however, only parts of the casing are shown at 6 and a portion of its shaft is shown at 7.

The moving blades 3 of the compressor are arranged in well-known manner as annular sets, each such set being supported in the example shown by a disc-shaped rotor member 8. All rotor members 8 are jammed together by means of a hollow bolt 9. In this state the rotor members 8 bear against each other by means of inner and outer cylindrical or substantially cylindrical flanges 10 and 11, respectively. Following the last rotor member 8 as reckoned in the direction of flow of the fluid (that is to say, the extreme right hand member 8 in the drawing) the balancing device according to the invention is provided. Said device comprises—see also Fig. 2— an annular thrust disc 12 rigidly connected at its outer periphery, as by means of axial bolts 13, to a circumferential flange 14 of said extreme right hand rotor element 8. Formed in said annular flange 14 and/or in a corresponding flange of the disc 12 are ports 15 through which the space between the discs 8 and 12 communicates with the blade receiving channel of the compressor to transmit the pressure prevailing in said channel to said space.

Provided in said space between the discs 8 and 12 is a partition comprising a conical balancing disc 16 which extends in an oblique outward direction between the members 12 and 8 without having any mechanical connection with said members. Provided between the inner periphery of disc 16 and member 12 is a labyrinth packing 17 and provided between the outer periphery of disc 16 and member 8 is a labyrinth packing 18 for sealing purposes. In order to make the disc 16 as rigid as possible, thereby permitting it to positively retain its sealed position, its conicity should be as great as possible, that is to say, as great as the space between the discs 8 and 12 allows.

The balancing disc 16 is rigidly connected at its inner periphery to a drum-like wall member 19 which projects from a wall 20 belonging to the stationary outlet device of the machine. Through a port or ports 21 formed in said wall 20 the right hand surface of the thrust disc 12 is subjected to the atmospheric pressure or to another low pressure as compared with the pressure inside the machine through a port or ports 22 formed in the drum-like wall member 19 said pressure is transmitted to the space 23 between the balancing disc 16 and the adjacent rotor member 8.

It is thus seen that the thrust disc 12 is subjected to an axial thrust acting in the direction indicated by the arrow c which corresponds to the pressure above atmospheric prevailing in that stage of the compressor with which the parts communicate. At the same time the opposite surface of the said adjacent rotor member 8 is relieved from said pressure above atmospheric by the action of disc 16, so that no balancing of the pressure acting on disc 12 is effected by means of the adjacent rotor member. The axial thrust indicated by the arrow c is thus imparted to the rotor unit by means of the bolts 13.

The fluid to be compressed is assumed to pass through the compressor in the direction of the arrow a. This gives rise to an axial thrust in the direction of the arrow b. In case of a jet propulsion unit, as assumed in the example shown, which comprises a turbine and a compressor coupled thereto, an axial thrust is obtained in the turbine which is directed oppositely to the arrow b; as said thrust, however, is less than the force acting in the direction b, a resulting axial thrust in the direction b will, nevertheless, result which must be balanced. The balancing action thus required is produced by the axial thrust acting on disc 12 in the direction of arrow c.

In the embodiment of the invention hereinbefore described the disc 12 carries the last set of moving blades 3 of the compressor with a resulting reduction of the weight of the unit, which is of a great importance in case of units for aeroplanes. A similar reduction is, of course, not required, for instance, in case of units for stationary plants; in such cases a separate disc may be used without any other function than that of balancing the axial thrust.

Due to the freehung mounting of the thrust disc 12, the space between said disc and the adjacent (or last) rotor member 8 will be freely accessible from inside. In such case, the disc 16 having for its purpose to balance the thrust on said rotor member 8, may be formed as a single piece and may still be mounted on its place without any difficulty. With the use of a different arrangement of the thrust disc, a division of disc 16 into two or more parts would be unavoidable. This feature, namely, that the disc 16 may be formed as a single piece the advantage is gained that the disc may be made considerably thinner and lighter than a divided disc of the same strength composed of members bolted together. As well-known, a light structure is of the greatest importance especially in case of jet propulsion units for aeroplanes in order to reduce the total weight without departing from the requirements as to strength.

What I claim is:

1. In a device for balancing the axial thrust in elastic fluid machines of the axial flow type having a frame, a rotor and blading carried by said rotor, the combination of an annular thrust disc subjected to the pressure prevailing in the machine, means for rigidly connecting the outer circumference of said annular thrust disc to the outgoing end of the rotor of the machine adjacent the blading thereof, so that the thrust disc extends inwardly in a freehung relation to the rotor, a communication being provided between the space on one side of the thrust disc and a low pressure as compared with the pressure existing in the machine, an annular balancing disc for shielding off the space on the other side of the thrust disc from said low pressure, a rigid connection being provided between said balancing disc and the frame of the machine, said balancing disc bridging the space between the thrust disc and an adjacent member of the rotor, sealing means being provided between the inner periphery of the balancing disc and the thrust disc and other sealing means being provided between the outer periphery of the balancing disc and said rotor member for tightly closing the space between the balancing disc and said other side of the thrust disc against said low pressure a communication being provided between an inner point of pressure of the blading of the machine for subjecting the surface of the thrust disc exposed to said space to the pressure prevailing in the machine, the space between the balancing disc and said rotor member being in communication with said low pressure for preventing the pressure derived from inside the machine from being balanced by a corresponding pressure on said rotor member.

2. In a device as claimed in claim 1, the further feature that said low pressure consists of the atmospheric pressure.

3. In a device as claimed in claim 1, the further feature that the thrust disc carries an annular set of moving blades of the blading of the machine.

4. In a device as claimed in claim 1, the further feature that the thrust disc carries the last annular set of moving blades of the blading of the machine as reckoned in the direction of flow of the fluid.

5. In a device as claimed in claim 1, the further feature that the thrust disc is provided at the outgoing end of a multi-section rotor of an axial flow compressor.

6. In a device as claimed in claim 1 and in which the thrust disc is provided at the outgoing end of a multi-section rotor of an axial flow compressor having a stationary outlet device, the further feature that the balancing disc is connected at its inner periphery to a drum-like wall member of the stationary outlet device to the compressor so as to be supported thereby.

7. In a device as claimed in claim 1, the further feature that the thrust disc is provided at the outgoing end of a multisection rotor of an axial flow compressor coupled to a turbine for driving the compressor.

8. In a device as claimed in claim 1, and in which the thrust disc is provided at the outgoing end of a multi-section rotor of an axial flow compressor having a stationary outlet device and being coupled to a turbine for driving the compressor, the further feature that the balance disc is connected at its inner periphery to a drum-like wall member of the stationary outlet device of the compressor so as to be supported thereby.

FRANS ERIC OSSIAN ÖSTMAR.

No references cited.